Figure 1:
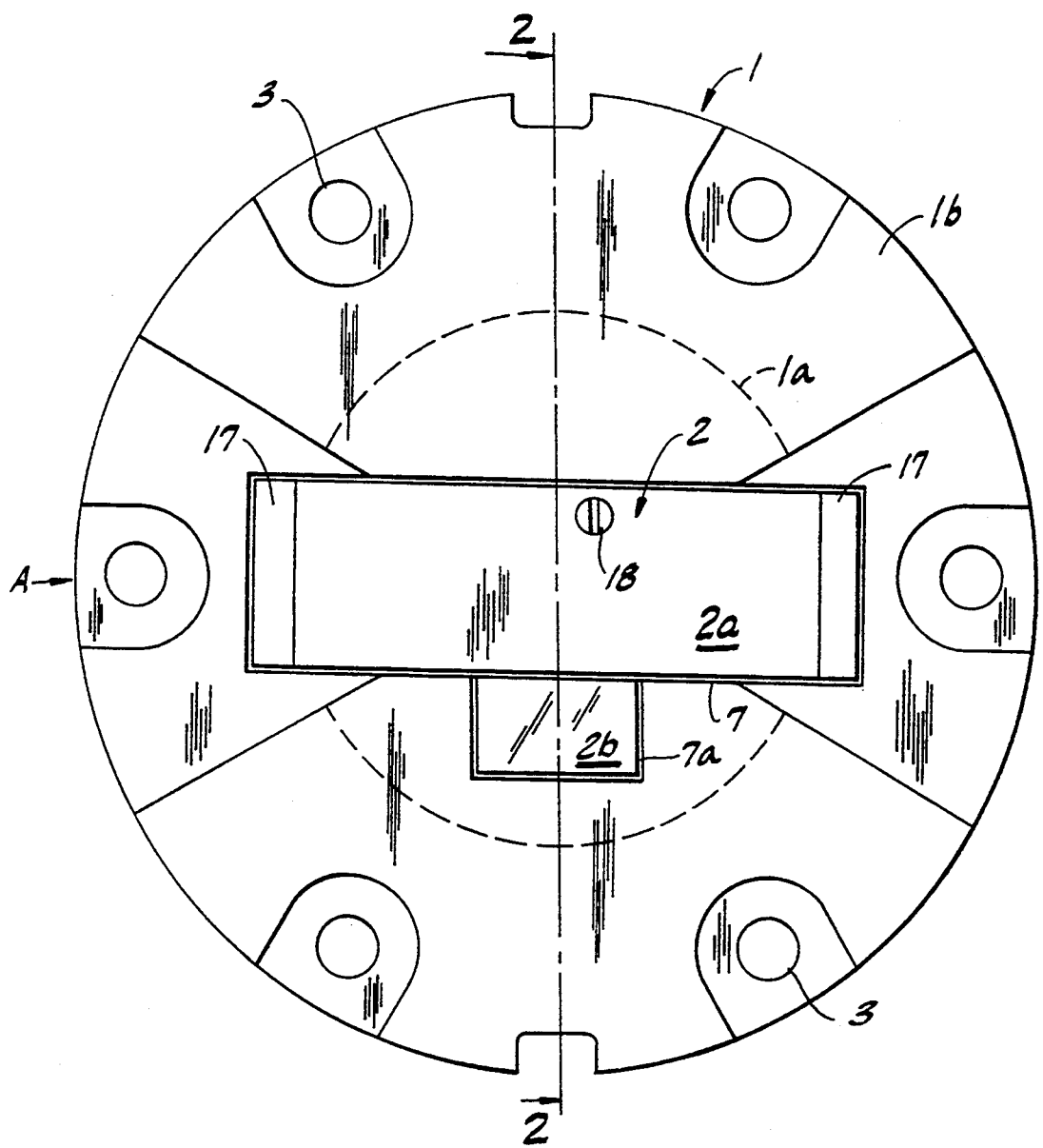

United States Patent [19]

Conway

[11] Patent Number: 5,414,603
[45] Date of Patent: May 9, 1995

[54] AIRPORT LIGHTING UNIT

[76] Inventor: David H. Conway, 12 Chanctonbury Way, Crowley, West Sussex, England, RH11 8TE

[21] Appl. No.: 50,384

[22] Filed: Jun. 14, 1993

[30] Foreign Application Priority Data

Nov. 6, 1990 [GB] United Kingdom ............... 9024083
Aug. 20, 1991 [GB] United Kingdom ............... 9117953

[51] Int. Cl.⁶ .................................................. F21S 1/02
[52] U.S. Cl. .................................. 362/153.1; 362/293; 362/364
[58] Field of Search ............ 362/293, 364, 153.1, 362/330

[56] References Cited

U.S. PATENT DOCUMENTS

| 3,369,113 | 2/1968 | Loch | 362/267 |
| 3,535,504 | 10/1970 | Beal et al. | 362/309 |
| 4,924,364 | 5/1990 | Pannier | 362/364 |

FOREIGN PATENT DOCUMENTS

| 2145870 | 2/1973 | France . | |
| 2369159 | 5/1978 | France . | |
| 1252813 | 11/1971 | United Kingdom . | |
| WO88/05516 | 7/1988 | WIPO . | |

OTHER PUBLICATIONS

"Startbahnfeuer", Feb. 29, 1968, Westinghouse, pp. 1–18.

Primary Examiner—Ira S. Lazarus
Assistant Examiner—L. Heyman
Attorney, Agent, or Firm—Senniger, Powers, Leavitt & Roedel

[57] ABSTRACT

A lighting unit particularly for airports includes a base unit (1) for securing at ground level, and a demountable module (2) including a lamp (9) and a pair of oppositely disposed optical elements (11, 12, 17) for directing the light beam along prescribed light emitting paths. Electrical contacts (6, 16) are respectively mounted on the base (1) and the module (2) for mating together when the module (2) is in place, and are situated in a position which is above ground level when the unit is secured to the ground.

5 Claims, 4 Drawing Sheets

AIRPORT LIGHTING UNIT

The present invention relates to a lighting unit primarily intended for use at airports and of the kind which is set on or into the ground to provide illumination at ground level adjacent runways and taxiways for the benefit of aircraft and other airport vehicles.

Many different constructions of such lighting units are known including some which have the lamp and associated lens unit contained in a casing which is separable from the base of the lighting unit in order to facilitate servicing and replacement of the lamp and lens assembly. However existing constructions are complex and expensive and moreover tend to suffer from electrical faults particularly due to water entering the electrical contacts between the demountable casing and the base of the unit.

It is an object of the invention to provide a lighting unit particularly for airports in which the lamp and lens assembly is contained in a demountable module and which forms an inexpensive, reliable and readily serviceable unit.

According to the present invention, a lighting unit particularly for airports comprises a base unit adapted to be secured at ground level and including first electrical contact members; and a demountable module releasably connected to the base unit, said module including a lamp, at least one lens forming part of a light emitting path and second electrical contact members for mating with said first electrical contact members when the module is located in position in the base unit, both said first and second electrical contact members being situated at a position which is above ground level when the lighting unit is secured on or into the ground.

In a preferred arrangement the module has two oppositely disposed light emitting paths each including a said lens.

According to a feature of the invention the or each lens is a prism lens for gathering light from the lamp and which assists in producing the required beam shape.

With such a construction only this component has to be different for a unit intended for straight runway/taxiway sections and a unit intended for curved runway/taxiway sections in order to provide the correct angle for the emitted light beam under all conditions. In a preferred embodiment optical means are provided which consists of a bi-convex lens, a dichroic filter and said prism lens. As mentioned above, the latter component is chosen depending on whether the lighting unit is to be used on a straight runway/taxiway section or a curved runway/taxiway section. To this end the prism lens is preferably accessible from the outside of the lighting unit and can be arranged so that either a straight section lens or a curved section lens can be fitted.

In an alternative arrangement, the inner face of the prism lens can be dichroic coated, thus dispensing with a separate dichroic filter, or the prism lens can be colored.

According to an alternative feature of the invention, the module includes a reflector for gathering light from the lamp and which assists in producing the required beam shape, said reflector extending substantially from the lamp to the lens. Where two lenses are provided, a separate reflector is associated with each lens.

In this arrangement, the or each reflector is preferably designed to gather as much light as possible from the lamp and direct it to the required beam shape. Thus the reflector plays a major part in shaping the beam. Two different reflector shapes may be provided, one for straight sections of taxiway or runway and one four curved sections, in order to provide the correct angles for the emitted light beam under all conditions.

In a preferred construction the lamp fits into a lamp holder which forms a part of the module and is releasably secured to the main part of the module such that the lamp itself extends into the main part of the module. The second electrical contacts are carried by the lamp holder for engagement with the first electrical contacts in the base unit when the module is located in position.

The lamp holder may be made from a translucent material so that a small amount of light or a glow is visible from the top of the unit to indicate when it is alight to an observer at a remote point, such as in a control tower.

The module is preferably located in a recess in the base unit and secured therein by a single fastening member, such as a bolt located to one side of the module. In such an arrangement opposite side walls of the module and the abutting walls of the recess can be slightly angled or offset such as to restrain the module against movement out of the recess when the securing bolt is tightened.

Figure 2:
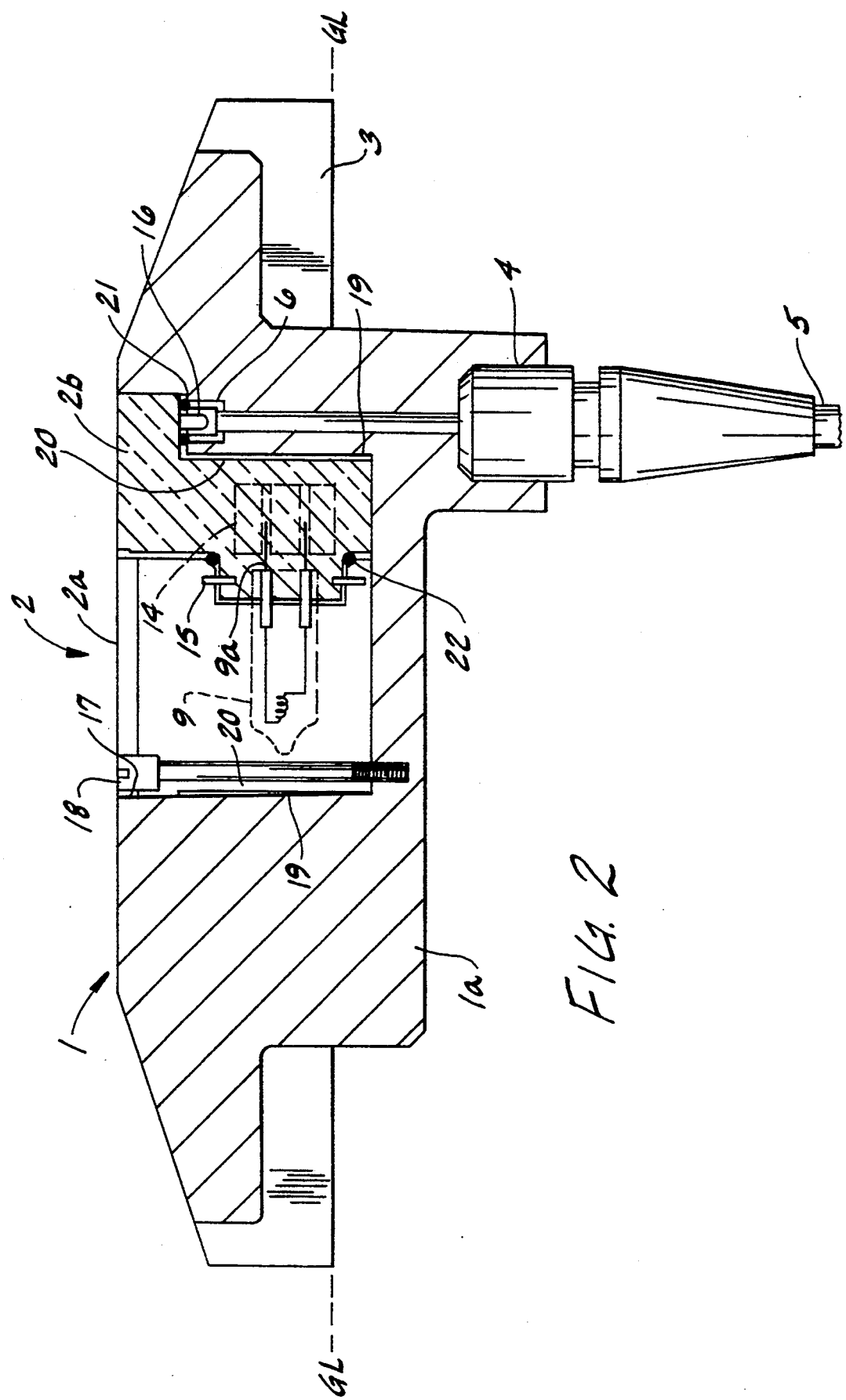
Figure 3:
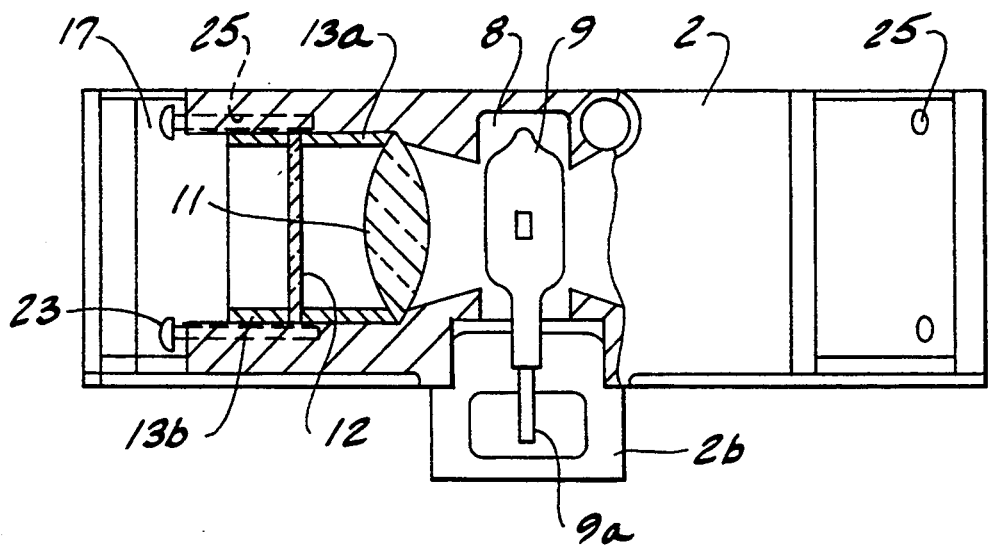
Figure 4:
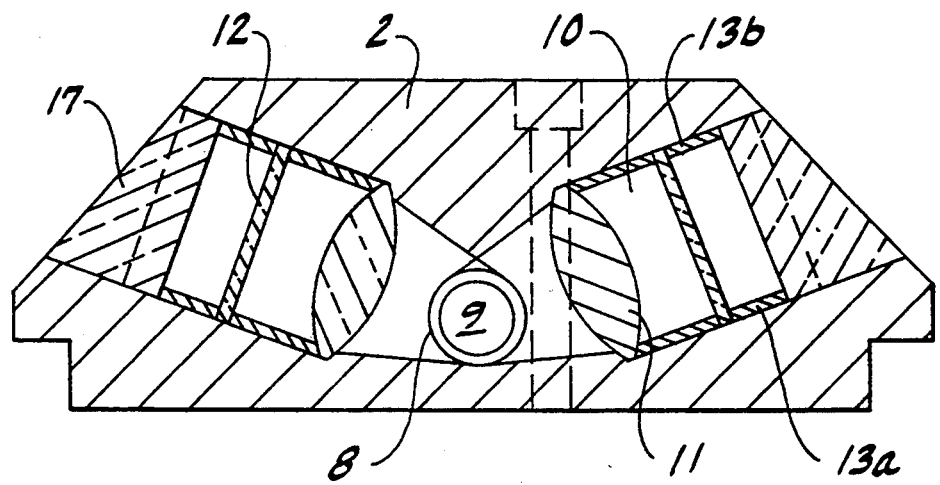
Figure 5:
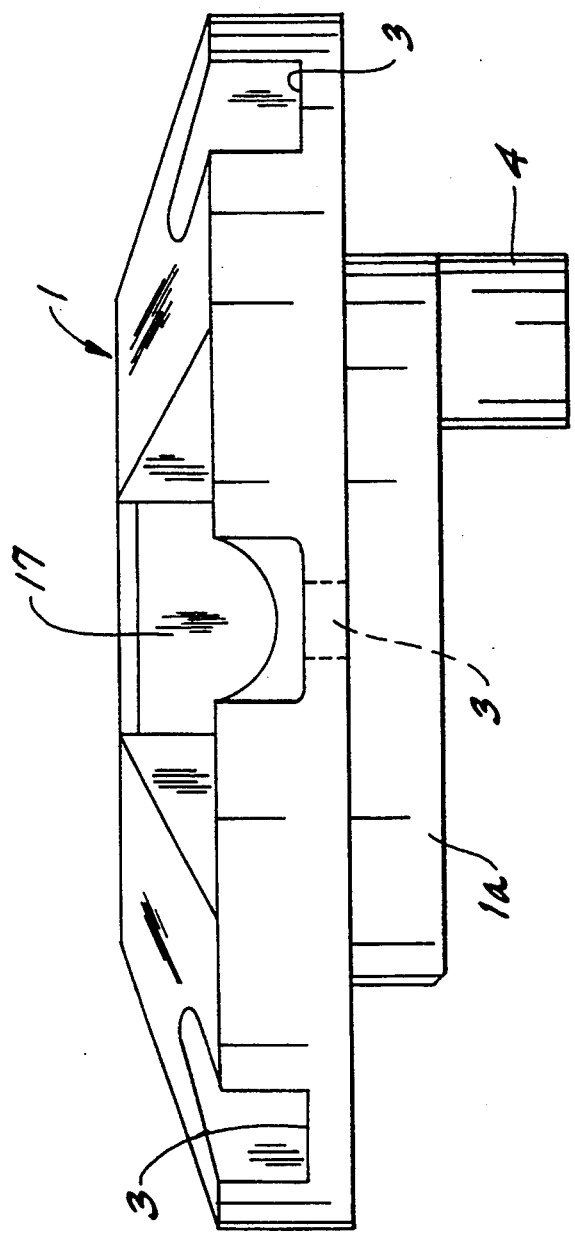

The invention will now be further described by way of example with reference to the accompanying drawings, in which:

FIG. 1 is a plan view of one embodiment of lighting unit according to the invention, FIG. 2 is a cross-section taken on the line II—II in FIG. 1, FIG. 3 is a plan view in section of the demountable module, FIG. 4 is an elevational view in section of the demountable module, and FIG. 5 is a side elevation of the lighting unit in the direction of arrow A in FIG. 1.

Referring to the drawings, the lighting unit to be described is particularly intended to be set in the surface of a runway or taxiway at an airport. The unit comprises two main parts namely a base generally indicated at 1 and a demountable module generally indicated at 2. The base 1 comprises a circular metal casting having a central lower portion 1a and a peripheral region 1b for resting in a preformed ground recess. This latter region is provided with holes 3 to receive bolts by means of which the lighting unit is secured in position. The central portion 1a supports a cable gland 4 through which an underground cable 5 can be fed to electrical contacts 6 located to one side of a recess 7 formed in the upper surface of the base 1. The recess 7 is of generally rectangular form but includes a salient or bay 7a. The demountable module 2 itself consists of two interconnected parts, namely a main module housing 2a and a lamp holder 2b. The main module housing, which may be an alloy casting, is hollowed to provide a central horizontal cavity 8 for receiving a lamp 9 and two oppositely directed cavities 10 shaped to be of generally cylindrical form. Each cavity 10 houses a bi-convex lens 11 adjacent the lamp 9, a dichroic filter 12 separated from the bi-convex lens 11 by a spacer ring 134 and a prism .lens 17 separate from the dichroic filter by a further spacer ring 13b.

The demountable module 2 includes a pair of apertures 25 adjacent the outer end of each cavity 10 for receiving bolts 23 securing each prism lens 17 in place.

The bolts 23 are positioned so as to be easily accessible to facilitate the substitution of either straight or curved section lenses. Alternatively, the appropriate prism lens can be fixed in position with an adhesive.

The connecting pins 9a of the lamp 9 protrude from the housing 2a and are received into a complementary electrical socket 14 in the lamp holder 2b which effectively supports the lamp. The lamp holder 2b may be made of a translucent plastics material and is secured to the housing 2a in a readily releasable manner by means of a bayonet connection comprising a pair of studs 15 projecting from the housing which fit into shaped apertures (not shown) in the lamp holder. Thus the lamp holder 2b is inserted into its location at an angle and then twisted slightly to engage the bayonet connection so that it is securely located against an O-ring seal 22. It can be readily released by turning the holder in the opposite direction and withdrawing it. The contacts of the socket 14 are electrically connected to pins 16 projecting from the underside of the lamp holder and which engage with the electrical contacts 6 when the module 2 comprising the interconnecting housing 2a and lamp holder 2b is lowered into the recess.

The module 2 is secured in position in the recess 7 of the housing by means of a securing bolt 18 which passes down through the main body of the housing into a threaded aperture in the base 1. The lamp holder 2b is then located in the bay 7a.

In order to prevent any undesirable movement of the module 2 relative to the recess 7 when it is secured by the single bolt 18, the opposite abutting sidewalls 19, 20 of the recess 7 and the module 2 can be offset at a small angle, e.g. 2° which serves to prevent relative movement. However, once the bolt 18 is released, the module can be readily withdrawn from the recess for servicing. If desired a spring (not shown) may be arranged underneath the module so that it pops up from the recess when the bolt 18 is released in order to assist in removing the module from the recess. The lamp can be quickly and easily changed by simply releasing the lamp holder 2b and withdrawing the lamp from the cavity 8.

A rubber or similar strip may be fixed around the top edge of the module aperture in base 1 so that when module 2 and lampholder 26 are inserted into base 1 they are sealed around their periphery.

It will be noted that with the construction described, the mating electrical contacts 6, 16 are situated well above the ground level GL and hence are not liable to be affected by ground water running into the contacts, as is readily possible with prior art constructions. The area of the contacts is also protected by an O-ring or gasket seal 21 and a further such seal 22 is provided between the lamp holder 2b and the housing 2a. Drainage apertures (not shown) are also provided in the base unit 1.

By reason of the features of the present invention, not only is it possible to provide a lighting unit which is identical for both straight and curved runway/taxiway sections, apart from the outer prism lens which is readily changeable; but the lamp holder can be removed and the lamp replaced in a very short time.

By reason of the simple and inexpensive nature of the module 2 it can, if desired, be treated as a throw-away unit, which means that servicing of a faulty module can be speedily carried out by merely fitting a replacement.

While a particular embodiment has been described it will be understood that various modifications may be made. For example the lighting unit may only comprise one light emitting path. The shape and configuration of the module and its recess may be other than that shown and the various parts of the light unit may be made of alternative materials to those mentioned.

I claim:

1. A lighting unit for airports comprising a base unit adapted to be secured at ground level and a demountable module releasably connected to the base unit, the base unit including first electrical contact members and the demountable module including a lamp communicating with two oppositely disposed and upwardly inclined cavities each defining a light emitting path and second electrical contact members for mating with said first electrical contact members when the module is located in position in the base unit, each cavity including a bi-convex lens and a prism lens, and a lamp holder for supporting the lamp, the lamp holder being translucent so that a small amount of light or a glow is visible from the top of the unit to indicate to an observer at a remote point when it is alight.

2. A lighting unit as claimed in claim 1, wherein each cavity further includes a dichroic filter.

3. A lighting unit as claimed in claim 1 wherein the demountable module includes a lamp holder for receiving the lamp, the lamp holder being releasably secured to the module.

4. A lighting unit as claimed in claim 3 wherein the second electrical contacts are carried by the lamp holder.

5. A lighting unit as claimed in claim 1 wherein the module is located in a recess in the base unit and is secured therein by a single fastening member.

* * * * *